United States Patent
Jordan et al.

(10) Patent No.: US 9,591,376 B2
(45) Date of Patent: Mar. 7, 2017

(54) METHOD AND SYSTEM FOR SYNCHRONIZING SIGNALS IN A COMMUNICATION SYSTEM

(75) Inventors: John P. Jordan, Santa Cruz, CA (US); Jason C. Demas, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2355 days.

(21) Appl. No.: 11/470,352

(22) Filed: Sep. 6, 2006

(65) Prior Publication Data
US 2008/0060045 A1    Mar. 6, 2008

(51) Int. Cl.
| | |
|---|---|
| H04N 7/12 | (2006.01) |
| H04N 11/02 | (2006.01) |
| H04N 11/04 | (2006.01) |
| H04N 21/643 | (2011.01) |
| H04J 3/06 | (2006.01) |
| H04N 7/173 | (2011.01) |
| H04N 21/43 | (2011.01) |
| H04N 21/44 | (2011.01) |

(52) U.S. Cl.
CPC ..... *H04N 21/64322* (2013.01); *H04J 3/0632* (2013.01); *H04N 7/17318* (2013.01); *H04N 21/4305* (2013.01); *H04N 21/44004* (2013.01)

(58) Field of Classification Search
USPC .................. 375/240.28; 33/240.28
See application file for complete search history.

(56) References Cited

U.S. PATENT DOCUMENTS

| | | | |
|---|---|---|---|
| 6,298,088 B1 * | 10/2001 | Bhatt et al. ............. 375/240.28 |
| 6,581,164 B1 * | 6/2003 | Felts et al. .................... 713/400 |
| 6,697,432 B2 * | 2/2004 | Yanagihara et al. ...... 375/240.26 |
| 7,184,450 B1 * | 2/2007 | Wolf et al. .................... 370/535 |
| 2001/0004366 A1 * | 6/2001 | Matsumura et al. ......... 370/509 |

* cited by examiner

*Primary Examiner* — Chikaodili E Anyikire
(74) *Attorney, Agent, or Firm* — Foley & Lardner LLP

(57) ABSTRACT

Synchronizing signals in a communication system may include determining the amount of data stored in a buffer, comparing the amount of data to a plurality of threshold levels and adjusting a speed of a clock used for decoding the data based on the comparing. The signals to be synchronized may correspond to a decoder clock in a set top box and to an encoder clock in a head end. The data in the buffer may correspond to packets of data corresponding to compressed audio and video information. The process may also include decoding information based on the clock and slew limited limiting the clock may. The process may further include setting at least one threshold to a calibration threshold during a calibration mode and a post-calibration threshold during a post-calibration.

26 Claims, 6 Drawing Sheets

METHOD AND SYSTEM FOR SYNCHRONIZING SIGNALS IN A COMMUNICATION SYSTEM

CROSS-REFERENCE TO RELATED APPLICATIONS/INCORPORATION BY REFERENCE

Not Applicable.

FIELD OF THE INVENTION

Certain embodiments of the invention relate to processing signals in a communication system. More specifically, certain embodiments of the invention relate to a method and system for synchronizing signals in a communication system.

BACKGROUND OF THE INVENTION

As the transmission of compressed audio and video information over the Internet has become more widespread, practical methods for eliminating the mismatch between the clock used for encoding the information and the clock used for decoding the information has gained importance. This problem may be seen in systems where a head end in a cable office communicates content over an IP based network to a set-top-box (STB) in the home. Historically, cable and satellite systems have made use of a phase-locked loop (PLL) in the STB to recover the system clock and accordingly synchronize the STB with the head end. This approach may be typical of both cable and satellite networks.

Synchronization of the clocks may become more challenging where there may be a significant amount of latency in the network. For example, in an IP based network, where packets of data may be sent from a source device to a destination device, the amount of time it takes for a packet of data to arrive at a destination may be a function of the number of users using the network and the path taken by the packet of data. In this regard, the amount of latency in the network may not be constant and the amount by which the latency varies may be considered packet jitter. As a result of the packet jitter, it may become challenging to recover timing information used in the encoding process in the head end.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for synchronizing signals in a communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for synchronizing signals in a communication system. Exemplary aspects of the invention may comprise synchronizing signals in a communication system by determining the amount of data stored in a buffer, comparing the amount of data to a plurality of threshold levels and adjusting a clock used for processing the stored data in response to results from the comparing. The communication may occur over an internet connection and the signals to be synchronized may correspond to a decoder clock in a set top box and to an encoder clock in a head end. The data in the buffer may correspond to packets of data corresponding to compressed audio and video information. The process may also include decoding information based on the clock and the clock may be slew limited. The process may further include setting at least one threshold to a calibration threshold (a first threshold) during a calibration mode and a post-calibration threshold (a second threshold) during a post-calibration.

Figure 1:
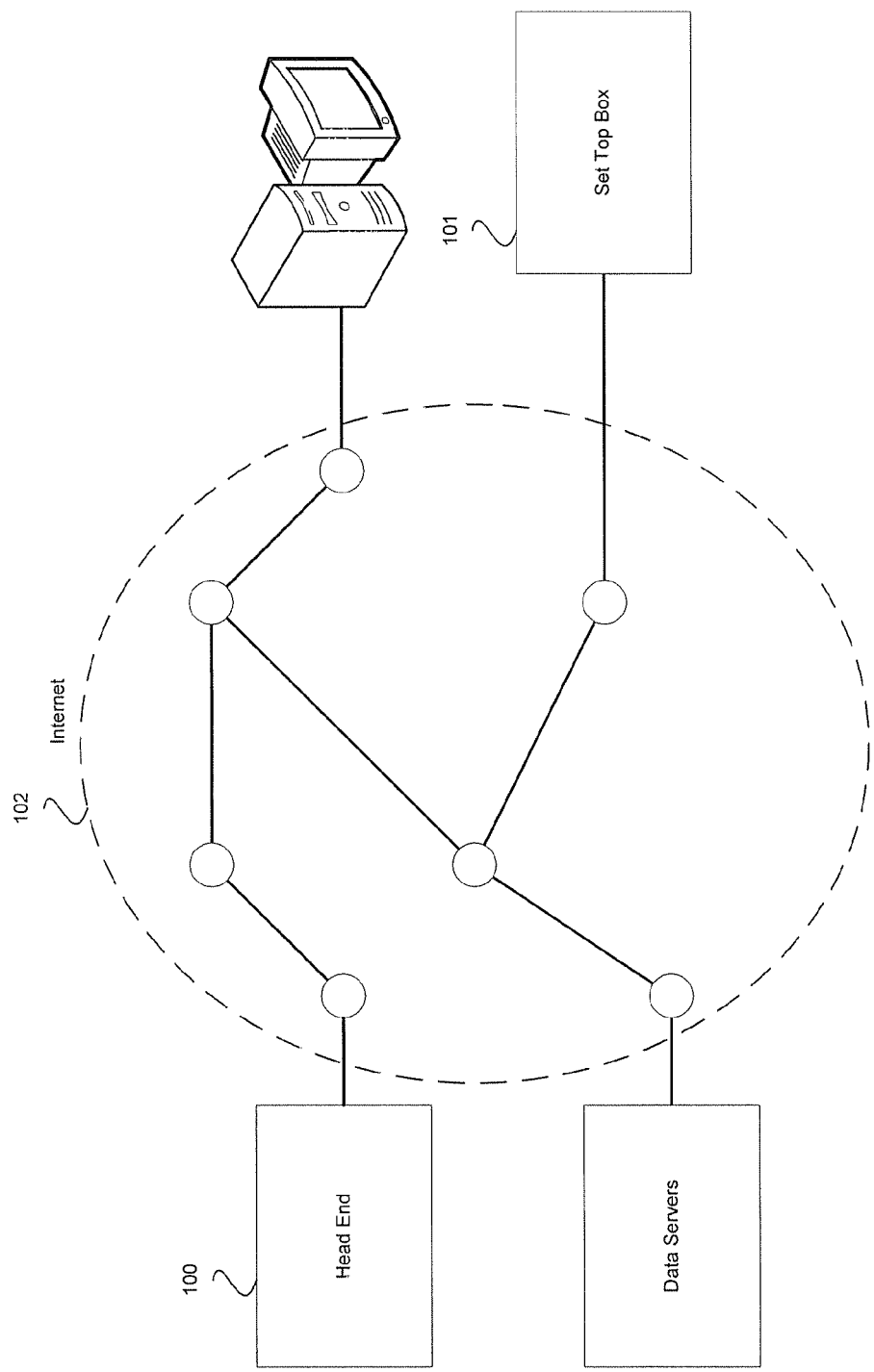
FIG. 1 is a diagram of a head-end system connected to a set-top-box via the internet, in connection with an embodiment of the invention.

FIG. 1 is a diagram of a head-end system connected to a set-top-box via the internet, in connection with an embodiment of the invention. Referring to FIG. 1, there is shown a head end 100, a set-top-box (STB) 101, and a network 102. The head end 100 may comprise suitable logic, circuitry, and/or code that may enable compression of analog audio and video information and communication of the compressed audio and video information through a network. For example, the head end 100 may encode the audio and video information using an MPEG compression technique and may then communicate the MPEG information via the internet. The set-top-box (STB) 101 may comprise suitable logic, circuitry, and/or code that may enable reception of compressed audio and video information communicated through a network and decompression of the information received into analog audio and video information.

The network 102 may comprise suitable logic, circuitry, and/or code that may enable communication of information in the form of packetized data from a source to a destination. For example, the network may be an IP based network with a plurality of sources communicating information to a plurality of destinations. In this regard, the head end 100 may be a source on the network 102 and the set-top-box 101 may be a destination. Communication over the network may be termed traffic. The amount of latency, which may be the time it takes for a packet of data to be communicated from a source to a destination, may fluctuate depending on the amount of traffic. The amount by which the latency fluctuates may be considered packet jitter. As a result of packet jitter, it may become challenging to recover timing information used in the encoding process in the head end. Various aspects of the invention disclose a novel approach for dealing with this issue.

Figure 2:
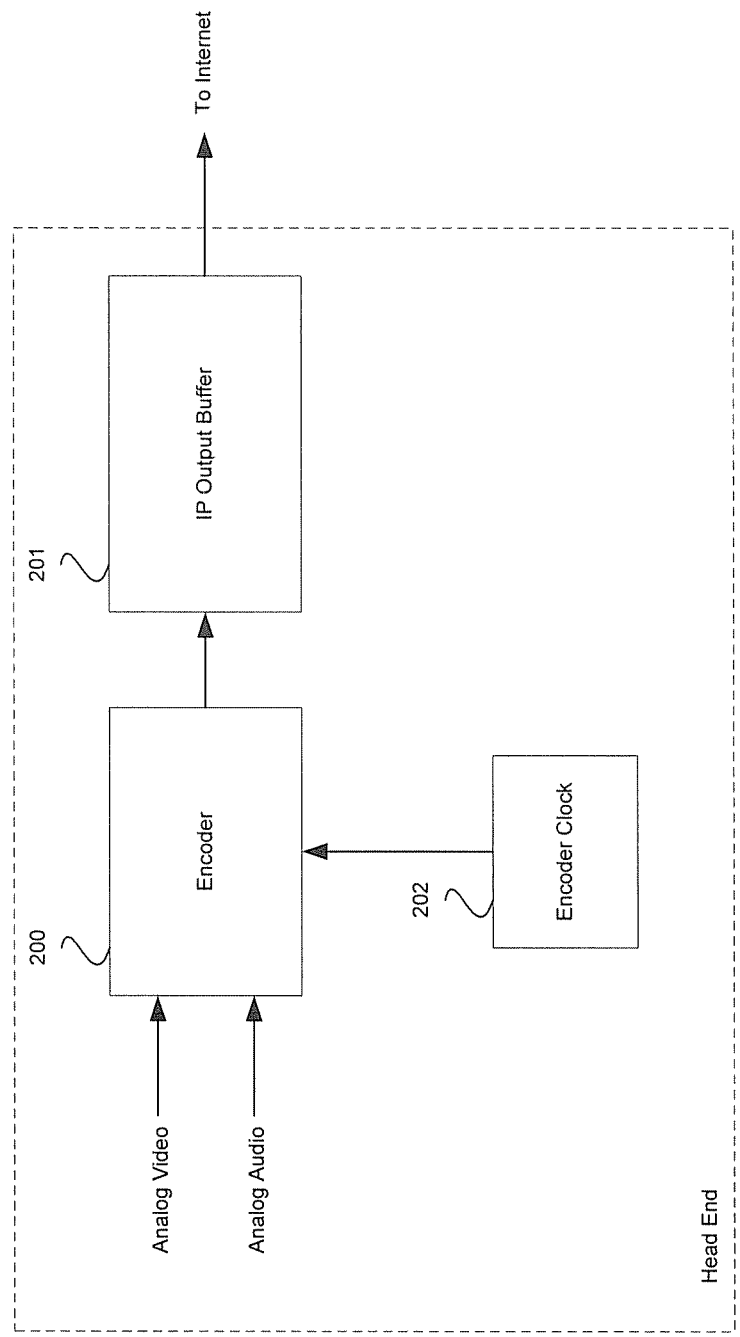
FIG. 2 is a block diagram of an exemplary head-end system, in connection with an embodiment of the invention.

FIG. 2 is a block diagram of an exemplary head-end 100 (FIG. 1), in connection with an embodiment of the invention. Referring to FIG. 2, there is shown an encoder 200, an IP output buffer 201, and an encoder clock 202. The encoder 200 may comprise suitable logic, circuitry, and/or code that may enable compression of video and audio information. For example, the encoder 200 may receive audio and video information and may, for example, utilize a variant of a MPEG standard to compress the audio and video information. The result may be packets of data with headers identifying the type of packet, which may be, for example, audio or video. The encoder 200 may utilize an encoder clock 202 in the processing of the audio and video information. For example, the encoder clock 202 may be used to sample the audio and video information input into the encoder 200. The encoder clock 202 may use a 27 MHz crystal (XTAL) as a reference. This crystal may, for example, have a tolerance of 30 parts per million (ppm). The encoder 200 may output packets of data representing compressed audio and video information to the IP output buffer 201.

The IP output buffer 201 may comprise suitable logic, circuitry, and/or code that may enable transmission of data over a network. For example, the IP output buffer 201 may receive packets of data containing compressed audio and video information from the encoder 200 and may store the packets into a buffer. The packets of information may stay in the buffer until communication may be allowed. The IP output buffer 201 may communicate the packets stored in the buffer through, for example, an IP based network 102 (FIG. 1). In this regard, the amount of time a packet of data stays in the buffer will vary with the amount of network traffic.

Figure 3:
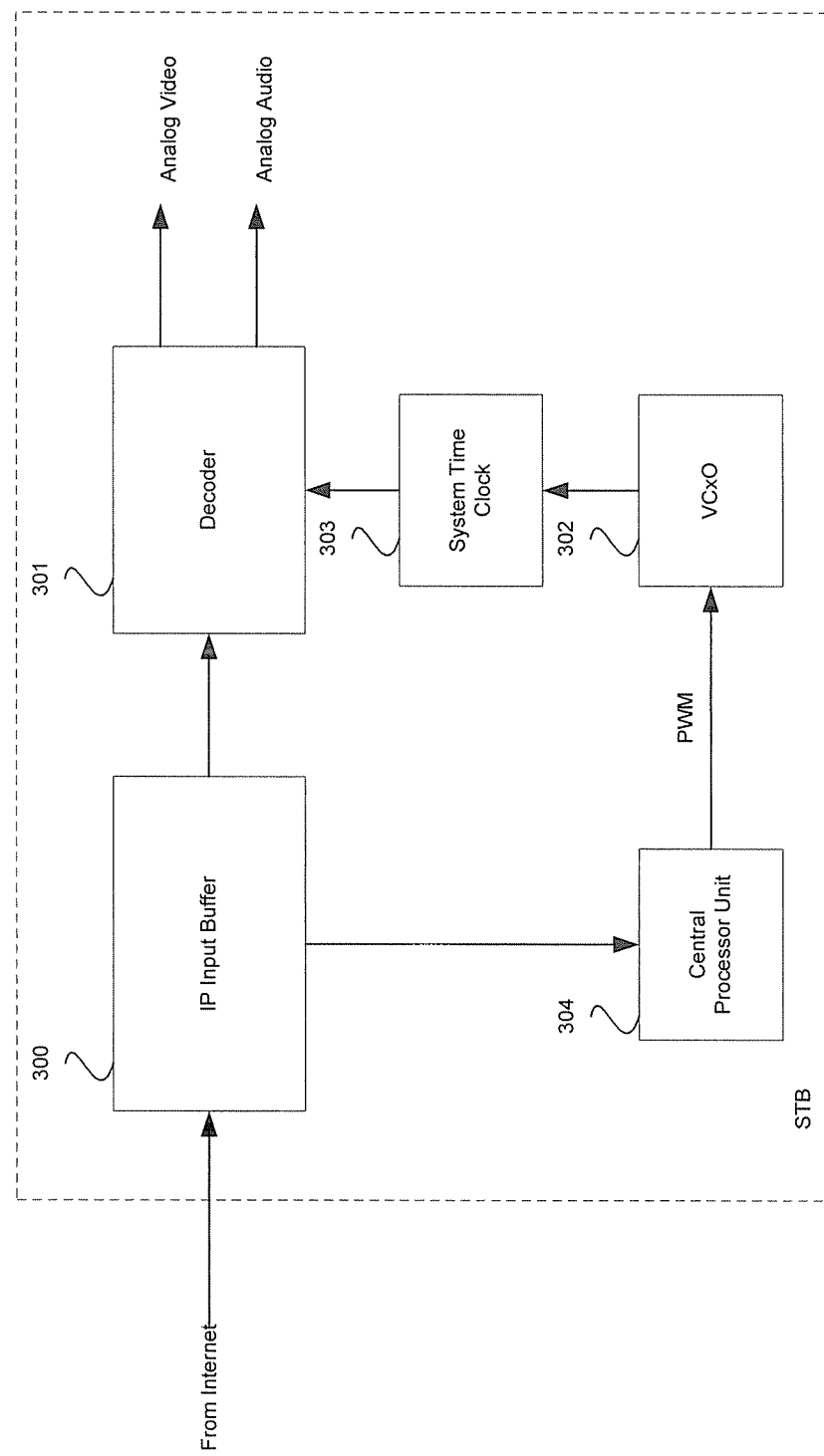
FIG. 3 is a block diagram of an exemplary set-top-box, in accordance with an embodiment of the invention.

FIG. 3 is a block diagram of an exemplary set-top-box 101 (FIG. 1), in accordance with an embodiment of the invention. Referring to FIG. 3, there is shown an IP input buffer 300, a decoder 301, a central processor unit (CPU) 304, a voltage controlled crystal oscillator (VCxO) 302, and a system time clock (STC) 303. The IP input buffer 300 may comprise suitable logic, circuitry, and/or code that may enable reception of packets of data communicated over a network. For example, the IP input buffer 300 may receive packets of data communicated over an IP based network. Some of these packets may come from the head end 100 (FIG. 1) and may represent compressed audio and video information. These packets may be stored in the IP input buffer 300 until the decoder 301 may be ready to process them. In this regard, the amount of information stored in the IP input buffer 300 may increase if the decoder 301 cannot immediately process the packets. The IP input buffer 300 may communicate the status, which may define how full the IP input buffer 300 may be, to a central processor unit 304.

The decoder 301 may comprise suitable logic, circuitry, and/or code that may enable decompression of packets of data containing compressed audio and video information. For example, the decoder 301 may receive packets of data from the IP input buffer 300 that may contain audio and video information that may have been compressed using a variant of a MPEG standard, for example. The packets may be stored in a buffer that may reside in the decoder 301 until they may be decompressed. The decoder 301 may then examine the header information of a packet to determine the type of data contained in the packet, for example, audio, video or other, and then may decompress the packet using the appropriate algorithm to output analog audio and analog video. The rate at which the decoder 301 decompresses the packets of information received may be related to a clock generated by the STC 303. For proper operation, it may be necessary to decompress the packets of data at the same rate the packets of data were originally compressed. For example, the decompression rate may be equal the encoder clock rate 202 (FIG. 2) used by the head end 100 (FIG. 1).

The central processor unit (CPU) 304 may comprise suitable logic, circuitry, and/or code that may enable monitoring the status of the IP input buffer 300 and controlling a VCxO 302 in response to the status. The VCxO 302 may comprise suitable logic, circuitry, and/or code that may enable generation of a clock in response to the CPU control 304. In this regard, the CPU 304 may control the VCxO 302 with a pulse width modulated (PWM) signal and may adjust the frequency of the VCxO 302 by varying the duty cycle of the PWM signal. For example, a duty cycle of fifty percent (50%) may correspond to a nominal VCxO clock frequency. The output of the VCxO may be used as a reference for the STC 303.

The STC 303 may comprise suitable logic, circuitry and/or code that may enable dividing the output of the VCxO 302 to a lower clock frequency. In an exemplary embodiment of the invention, the STC 303 may comprise a counter with a carry output. For example, the STC 303 may divide the VCxO 302 by four (4) by counting from zero (0) to three (3) and then repeating. The carry output of the counter may represent the divided clock and may be used as the output of the STC 303. The output of STC 303 may control the decoding rate of the decoder 301.

In operation, the CPU 304 may initially direct the VCxO 302 to output a nominal clock frequency, which may then be divided by the STC 303 to produce an initial decoding rate used by the decoder 301. Packets of data received by the IP input buffer 300 may be subsequently decoded by the decoder 301 at the initial decoding rate. The rate at which the packets of data enter the IP input buffer 300 may exceed the rate at which the decoder 301 decodes the packets. This rate mismatch may be the result of a difference between the encoder clock 202 (FIG. 2) frequency in the head end 100 (FIG. 1) and the STC 303 frequency. If this situation persists, the number of packets stored in the IP input buffer 300 may approach the capacity of the IP input buffer 300 resulting in an overflow condition. To prevent this situation, the CPU 304, via the PWM control, may increase the output frequency of the VCxO 302 by an incremental amount. This may in turn increase the decoding rate of the decoder 301, thus alleviating the mismatch condition.

When the rate at which the decoder 301 decodes the packets exceeds the rate at which packets enter the IP input buffer 300 there may again be a mismatch between the encoder clock 202 and the STC 303. However, under this scenario the IP input buffer 300 may experience an underflow condition. That is, the IP input buffer 300 may not have enough packets to support subsequent decoding by the decoding buffer 301. To prevent this situation, the CPU 304, via the PWM control, may decrease the output frequency of the VCxO 302 by an incremental amount. This may in turn decrease the decoding rate of the decoder 301, thus alleviating the mismatch condition. Over time, the optimal VCxO 302 output frequency may be determined, at which point subsequent adjustment of the VCxO 302 may no longer be necessary.

Figure 4:
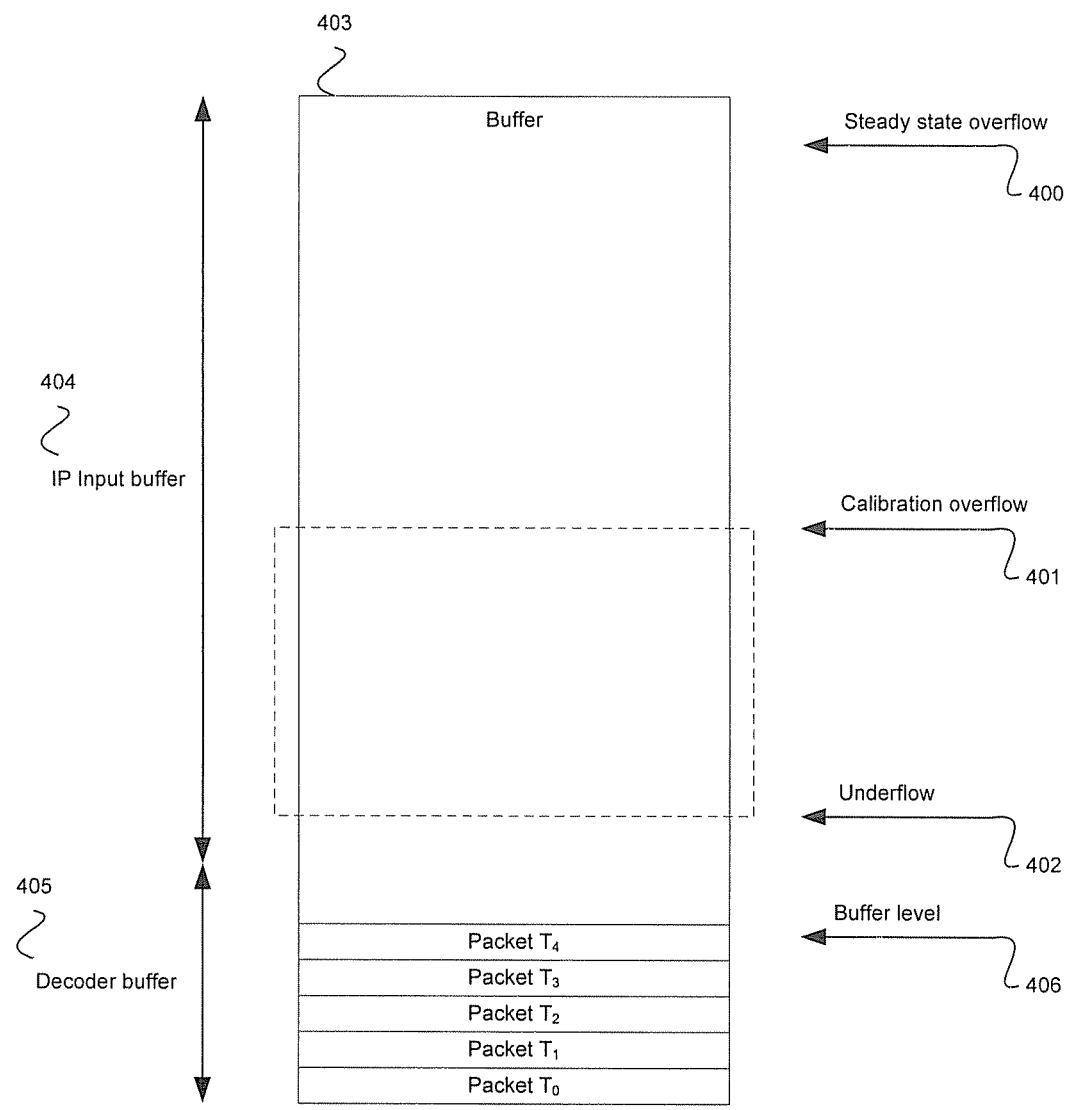
FIG. 4 is an exemplary representation of a buffer, which may represent an IP input buffer, and a buffer residing in a decoder.

FIG. 4 is an exemplary representation of a buffer, which may represent an IP input buffer, and a buffer residing in a decoder, in accordance with an embodiment of the invention. Referring to FIG. 4, shown is a buffer 403, a decoder buffer portion 405, an IP input buffer portion 404, a steady state overflow level 400, a calibration overflow level 401, an underflow level 402, and a buffer level 406. The buffer 403 may comprise suitable logic, circuitry and/or code that may enable storing packets of data. Part of the buffer 403 may reside in the IP input buffer 300 (FIG. 3) and part may reside in the decoder 301 (FIG. 3). In this regard, the buffer 403 may be conceptualized as one continuous buffer 403.

The various levels 400, 401 402 may be used to trigger various events in the CPU 304 (FIG. 3). For example, an underflow condition may be triggered when the buffer level 406 is lower than the underflow level 402. An overflow may be triggered when the buffer level 406 is greater than the overflow level. The overflow level may be equal to the calibration overflow level 401 if, for example, the STB 101 (FIG. 1) is in a calibration mode. The overflow level may instead equal the steady state overflow level 400 if, for example, the STB 101 (FIG. 1) is in a post-calibration or steady state mode. When the number of packets stored in the buffer 403 reaches the underflow level 402, the decoder 301 may begin decoding packets of data containing compressed audio and video into analog audio and video.

Figure 5:
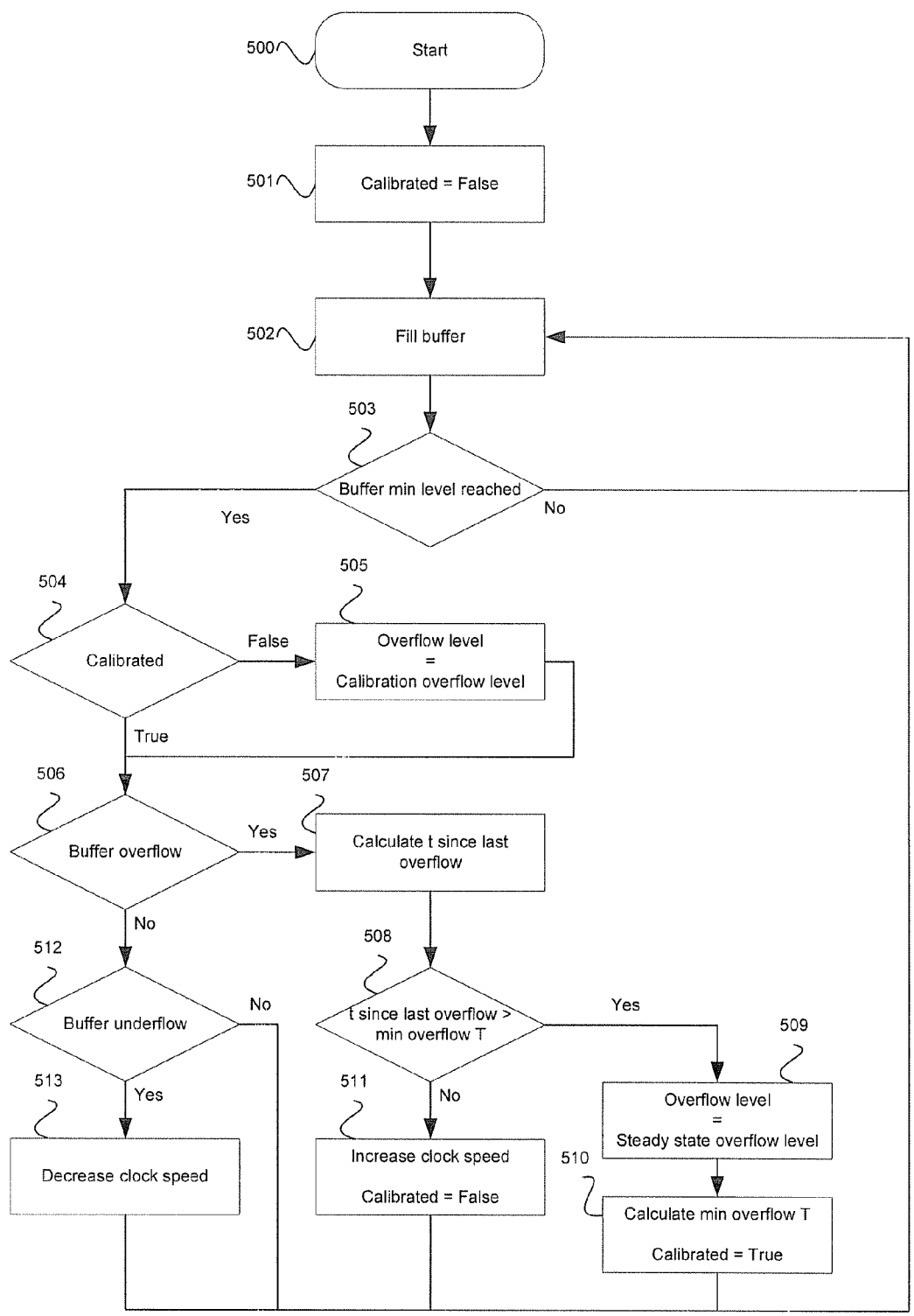
FIG. 5 is a flow diagram of an exemplary system for synchronizing signals in a communication system, in accordance with an embodiment of the invention.

FIG. 5 is a flow diagram of an exemplary system for synchronizing signals in a communication system, in accordance with an embodiment of the invention. Referring to FIG. 5, at step 500 the STC 303 (FIG. 1) in the STB 101 (FIG. 1) may not be synchronized to the encoder clock 202 (FIG. 2) in the head end 100 (FIG. 1). It may therefore be necessary to "calibrate" the STC 303. At step 501, a flag, for example "calibration", may be set to indicate that the STB 101 may be in calibration mode. At step 502, the CPU 304 (FIG. 3) may direct the IP input buffer 300 (FIG. 3) to receive packets of data from the network 102 (FIG. 1). These packets may be subsequently passed to the decoder 301 (FIG. 3). This process may be repeated at step 503 until buffer level 406 reaches the minimum level 402.

At step 504, the overflow level may be set to the level calibration overflow level 401 if, for example, the STB 101 is in calibration mode. Otherwise the overflow level may not be changed.

At step 506, the buffer level 406 may be compared to the current overflow level. An overflow condition may occur, for example, when the STC 303 in the 101 is running slower than the encoder clock 202 in the head end 100. If an overflow condition occurs, the amount of time since the last overflow may be calculated at step 507. This may be accomplished by using an overflow timer and resetting the overflow timer every time an overflow occurs. This period of time may then be compared to a minimum predicted overflow period at step 508. The minimum predicted overflow period may be determined by first calculating the steady state clock mismatch between the encoder clock 202 (FIG. 2) in the head end 100 (FIG. 1) and the STC 303 (FIG. 3) in the STB (101) (FIG. 1). This may be calculated using the following exemplary formula:

$$
\begin{aligned}
\text{ss\_clock\_mismatch\_ppm} = \\
(\text{IP\_MAX\_HE\_XTAL\_ERROR\_PPM}*2) + \\
((\text{IP\_PWM\_STEP\_SIZE} * \\
(\text{IP\_PWM\_DYNAMIC\_RANGE\_HZ}/2) * \\
\text{IP\_PWM\_STEPS\_PER\_VIOLATION})/ \\
\text{IP\_MAX\_PWM\_VALUE})/27;
\end{aligned}
$$

where, IP_MAX_HE_XTAL_ERROR_PPM may be the maximum head end 27 MHz XTAL tolerance, IP_PWM_STEP_SIZE may be the size of the instantaneous change of PWM value, IP_PWM_DYNAMIC_RANGE_HZ may be the maximum swing of STC clock frequency, IP_PWM_STEPS_PER_VIOLATION may be the number of instantaneous steps taken for a single buffer overflow or underflow event and IP_MAX_PWM_VALUE may be the magnitude of the maximum PWM value. With the steady state clock mismatch computed. The steady state buffer filling rate may be computed using the following formula:

$$
\begin{aligned}
\text{ss\_buffer\_filling\_rate} = \\
(\text{bitrate}*\text{ss\_clock\_mismatch\_ppm})/1000000;
\end{aligned}
$$

where bitrate may be equal to the encoding clock 202 frequency. The minimum overflow period can be computed using the following exemplary formula:

$$
\begin{aligned}
\text{ss\_minimum\_overflow\_period} = \\
\text{IP\_input\_buffer\_size}/(\text{ss\_buffer\_filling\_rate}/8)
\end{aligned}
$$

where IP_input_buffer_size may be the size of the IP input buffer 300 (FIG. 3).

If the amount of time since the last overflow is greater than the minimum predicted overflow period computed above, then the overflow level may be increased to the steady state overflow level 400 (FIG. 4) at step 509. At step 510, the overflow timer may be reset and the "calibration" flag may be set to true. This may indicate that the STC 303 in the STB 101 may be calibrated to the encoder clock 202 in the head end 100. At this point, the exemplary steps may return to step 502.

Referring back to 508, if the amount of time since the last overflow is less than the minimum predicted overflow period computed above, this may indicate that the STB 101 may not be calibrated and therefore the "calibration" flag may be set to false. This condition may occur, for example, when the STC 303 in the 101 is running slower than the encoder clock 202 in the head end 100. In this case, the CPU 304 (FIG. 3), via the PWM control, may increase the VCxO 302 (FIG. 3) output frequency. This in turn may increase the output frequency of the STC 303, which may then increase the rate at which the decoder 301 (FIG. 3) decodes the packets of data. At this point, the process may go back to step 502.

Referring back to step 506, if an overflow has not occurred, the buffer level 406 may be compared to the underflow level 402 (FIG. 4). If an underflow has not occurred then the process may repeat from step 502. However, if an underflow condition has occurred, then it may be necessary to decrease the frequency of the STC at step 513. In this case, the CPU 304 (FIG. 3), via the PWM control, may decrease the VCxO 302 (FIG. 3) output frequency. This in turn may decrease the output frequency of the STC 303, which may then decrease the rate at which the decoder 301 (FIG. 3) decodes the packets of data. At this point, the process may go back to step 502.

In operation, the STB 101, may enter an un-calibrated mode of operation when, for example, it is activated for the first time or, for example, when it is "tuned" to a new head end 100. In this mode, the level at which an overflow occurs may be set to a level lower than the size of the IP input buffer 300. This may be done so that any mismatch between the encoder clock 202 in the head end 100 and the STC 303 in the STB 101 may be detected more quickly. For example, if the overflow level where set to a higher position, the IP input buffer 300 may have to fill up with more packets before such a determination could be made. Another reason for setting the overflow level lower than the size of the IP input buffer 300 may be that it allows for the storage of more overflow packets. This in turn, may give the STB 101 enough time to make the necessary adjustments to the STC 303 in order to prevent future overflows from occurring faster than the minimum predicted overflow period, without losing packets.

While in calibration mode, the frequency of the VCxO 302 may be increased by a specific increment via the CPU 304. This in turn may increase the frequency of the STC 303, which may increase the decoding rate of the decoder 301. As the decoder 301 decode rate increases, the period between overflows may increase. Once the period between overflow exceeds the minimum predicted overflow period, the STB 101 may enter a steady state or post calibration mode. Once in post-calibration mode the overflow level may be increased to the steady state overflow level 400. This may allow the IP input buffer 300 to store more packets of data before an overflow occurs. The STB 101 may, however, revert to calibration mode if the time between overflows falls below the minimum predicted overflow period.

Whether or not in calibration mode, the STB 101 may have to slow down the decode rate when an underflow occurs. This may occur when the decoding rate of the decoder 301 is faster that the encoding 202 rate in the head end 100. The decode rate may be lowered by decreasing the frequency of the VCxO 302 by a specific increment via the CPU 304. This in turn may decrease the frequency of the STC 303, which may decrease the decoding rate of the decoder 301. By continually checking for overflow and underflow conditions this process may facilitate synchronizing the STC 303 in the STB 101 with the encoder clock 202 in a head end 100. Furthermore, by setting the initial overflow level to a calibration overflow level 401, which may be lower than a steady state calibration level 400, this process may decrease the amount of time it takes to synchronize the two clocks.

Figure 6:
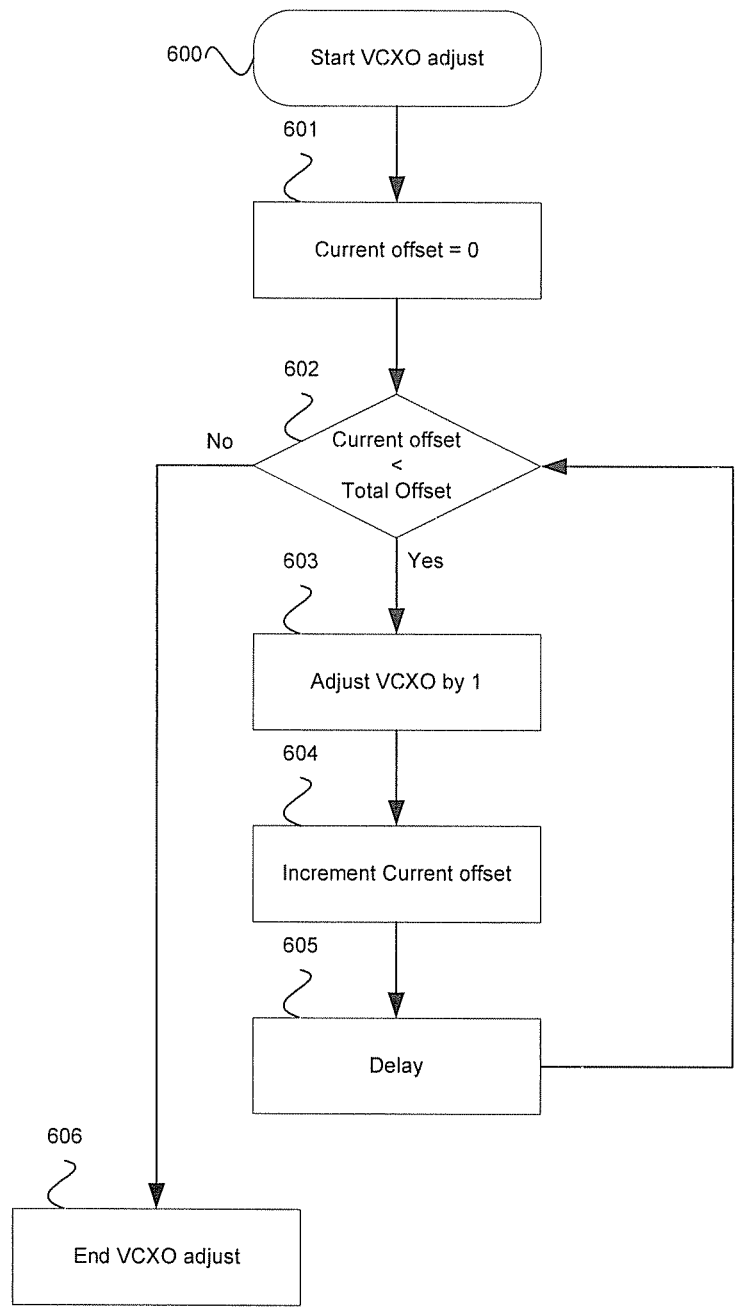
FIG. 6 is an exemplary flow diagram describing the VCXO adjustment procedure, in accordance with an embodiment of the invention.

FIG. 6 is an exemplary flow diagram describing the VCxO adjustment procedure, in accordance with an embodiment of the invention. Referring to FIG. 6, at step 601 an offset counter may be set to zero (0). The offset counter may then be compared to a total offset in step 602. The total offset may correspond to the amount of offset needed in the frequency of the VCxO 302 (FIG. 3). For example, it may be necessary to adjust the VCxO 302 by the normalized value 100. In this case, the total offset may equal 100. Referring back to step 602, if the offset is less than the total offset, then the VCxO 302 may be adjust by the normalized value one (1) in step 603 and the current offset counter may be increased by one (1). This process may be repeated until the current offset equals the total offset. A delay may be introduced at step 605 to prevent the VCxO 302 from changing too fast.

In operation, in instances where the decoding rate is increased or decreased, the rate of change of the increase or decrease may be controlled by controlling the rate of change of the VCxO 302. Various issues may arise in instances where the rate of change is not controlled. For example, if the VCxO 302 is allowed to change too fast, the STC 303 (FIG. 3) in the STB 101 (FIG. 1) may begin to oscillate and may lose synchronization with the encoder 202 in the head end 100 (FIG. 1). If the VCxO 302 adjusts too slowly, packets of information may be lost while the STB attempts to synchronize to the encoder in the head end. Therefore an optimal delay may be found that may balance these two constraints.

The optimal delay may be found by comparing the amount of data in the IP input buffer 300 (FIG. 3) to the various threshold levels 400, 401, 402, and 406 (FIG. 4) and adjusting the STC 303 in response to results from the comparing. The time it takes to adjust the STC may be decreased by using a lower overflow threshold during, for example, a calibration mode and by using a higher overflow threshold during, for example, a post-calibration mode of operation. Oscillations in the rate of change of the STC 303 may be prevented by slew limiting the rate of change.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for synchronizing signals in a communication system, the method comprising:
   setting an overflow threshold level to a first level during a calibration mode;
   determining a quantity of data in a buffer for a decoder;
   comparing said determined quantity of data to an underflow threshold level and the overflow threshold level corresponding to said buffer;
   when an overflow condition occurs based on said comparing to said overflow threshold level, comparing a time period between current and last overflows to a minimum overflow period; and
   adjusting a speed of a clock used for decoding said data based on said comparing to said underflow threshold level and said overflow threshold level and said comparing to said minimum overflow period.

2. The method according to claim 1, comprising setting said overflow threshold level to a second level during a post-calibration mode.

3. The method according to claim 1, comprising decoding information at a rate proportional to said adjusted clock speed.

4. The method according to claim 1, comprising storing said data corresponding to at least one of: compressed audio, and compressed video information, in said buffer.

5. The method according to claim 1, comprising slew limiting said clock used for said adjusting.

6. The method according to claim 1, comprising synchronizing said clock speed used for said adjusting to an encoder clock.

7. The method according to claim 6, wherein said encoder clock resides in a head end.

8. The method according to claim 1, wherein said clock used for said decoding resides in a set-top-box.

9. A machine-readable storage having stored thereon, a computer program having at least one code section for synchronizing signals in a communication system, the at least one code section being executable by a machine for causing the machine to perform steps comprising:
   determining a quantity of data in a buffer for a decoder;
   comparing said determined quantity of data to an underflow threshold level and an overflow threshold level corresponding to said buffer;
   when an overflow condition occurs based on said comparing to said overflow threshold level, comparing a time period between current and last overflows to a minimum overflow period; and
   adjusting a speed of a clock used for decoding said data based on said comparing to said underflow threshold level and said overflow threshold level and said comparing to said minimum overflow period.

10. The machine-readable storage according to claim 9, comprising code that sets said overflow threshold level to a first level during a calibration mode.

11. The machine-readable storage according to claim 9, comprising code that sets said overflow threshold level to a second level during a post-calibration mode.

12. The machine-readable storage according to claim 9, comprising code that decodes information at a rate proportional to said adjusted clock speed.

13. The machine-readable storage according to claim 9, comprising code that stores packets of data corresponding to at least one of:
   compressed audio, and video information, in said buffer.

14. The machine-readable storage according to claim 9, comprising code that slew limits said clock used for said adjusting.

15. The machine-readable storage according to claim 9, comprising code that synchronizes said clock speed used for said adjusting to an encoder clock.

16. The machine-readable storage according to claim 15, wherein said encoder clock resides in a head end.

17. The machine-readable storage according to claim 9, wherein said clock used for said decoding resides in a set-top-box.

18. A system for synchronizing signals in a communication system, the system comprising:
   one or more circuits that enables determining of a quantity of data in a buffer for a decoder;
   said one or more circuits enables comparing said determined quantity of data to an underflow threshold level and an overflow threshold level corresponding to said buffer;
   when an overflow condition occurs based on said comparing to said overflow threshold level, said one or more circuits enables comparing a time period between current and last overflows to a minimum overflow period; and
   said one or more circuits enables adjusting a speed of a clock used for decoding said data based on said comparing to said underflow threshold level and said overflow threshold level and said comparing to said minimum overflow period.

19. The system according to claim 18, wherein said one or more circuits sets said overflow threshold level to a first level during a calibration mode.

20. The system according to claim 18, wherein said one or more circuits sets said overflow threshold level to a second level during a post-calibration mode.

21. The system according to claim 18, wherein said one or more circuits decodes information at a rate proportional to said adjusted clock speed.

22. The system according to claim 18, wherein said one or more circuits stores packets of data corresponding to at least one of:
   compressed audio, and video information, in said buffer.

23. The system according to claim 18, wherein said one or more circuits slew limits said clock used for said adjusting.

24. The system according to claim 18, wherein said one or more circuits synchronizes said clock speed used for said adjusting to an encoder clock.

25. The system according to claim 24, wherein said encoder clock resides in a head end.

26. The system according to claim 18, wherein said clock used for said decoding resides in a set-top-box.

* * * * *